United States Patent
Bose et al.

(10) Patent No.: US 9,323,302 B2
(45) Date of Patent: Apr. 26, 2016

(54) ROTATING VOLTAGE CONTROL

(71) Applicant: International Business Machines Corporation, Armonk, NY (US)

(72) Inventors: Pradip Bose, Yorktown Heights, NY (US); Alper Buyuktosunoglu, White Plains, NY (US); Hans M. Jacobson, White Plains, NY (US); Victor Zyuban, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 14/134,428

(22) Filed: Dec. 19, 2013

(65) Prior Publication Data

US 2015/0177796 A1    Jun. 25, 2015

(51) Int. Cl.
*G06F 1/26* (2006.01)
*G06F 1/32* (2006.01)

(52) U.S. Cl.
CPC ............. *G06F 1/26* (2013.01); *G06F 1/3296* (2013.01)

(58) Field of Classification Search
CPC .................................................. G06F 1/26
See application file for complete search history.

(56) References Cited

U.S. PATENT DOCUMENTS

| | | | |
|---|---|---|---|
| 4,097,773 A * | 6/1978 | Lindmark | H02M 7/537 323/271 |
| 4,536,699 A | 8/1985 | Baker | |
| 6,396,169 B1 * | 5/2002 | Voegeli | G06F 1/26 307/33 |
| 6,617,817 B2 * | 9/2003 | Hill | G06F 1/26 318/432 |
| 2004/0164720 A1 * | 8/2004 | Ravon | G05F 1/575 323/282 |

(Continued)

FOREIGN PATENT DOCUMENTS

| | | |
|---|---|---|
| EP | 0996233 | 4/2000 |
| JP | 2011101355 | 5/2011 |
| JP | 2011167039 | 8/2011 |

OTHER PUBLICATIONS

M. Degermark et al., IP Header Compression (RFC2507), Feb. 1, 1999, Copyright (C) The Internet Society (1999), IP.com No. IPCOM000003090D, 38 pages.

*Primary Examiner* — Mark Connolly
(74) *Attorney, Agent, or Firm* — Cantor Colburn LLP

(57) ABSTRACT

According to one embodiment, a system is provided that includes at least one power gated component and two or more power switch transistors configured to provide one or more conductive paths between a common power supply rail, the at least one power gated component, and a ground. The two or more power switch transistors each include a source terminal, a drain terminal, and a gate terminal configured to control current flow between the source and drain terminals. The system also includes a rotating voltage control coupled to the gate terminals and configured to apply a sequence of control signals rotating between an on-state and an off-state to each of the gate terminals while the at least one power gated component is turned on. A switch activation ratio level is programmable to set a number of power switch transistors in the on-state relative to a total number of power switch transistors.

16 Claims, 6 Drawing Sheets

(56) References Cited

U.S. PATENT DOCUMENTS

| | | | |
|---|---|---|---|
| 2006/0242435 A1* | 10/2006 | Swope | G06F 1/26 |
| | | | 713/300 |
| 2006/0267629 A1 | 11/2006 | Bhattacharya | |
| 2007/0103202 A1 | 5/2007 | Mair et al. | |
| 2007/0230559 A1* | 10/2007 | Kris | H03K 7/08 |
| | | | 375/238 |
| 2008/0297063 A1 | 12/2008 | Willingham et al. | |
| 2011/0102072 A1 | 5/2011 | Idgunji et al. | |
| 2012/0081176 A1 | 4/2012 | Buechner et al. | |
| 2014/0191735 A1* | 7/2014 | Zhao | G05F 1/10 |
| | | | 323/271 |
| 2014/0266143 A1* | 9/2014 | Saint-Laurent | G05F 1/468 |
| | | | 323/351 |

\* cited by examiner

ROTATING VOLTAGE CONTROL

BACKGROUND

The present invention relates generally to computer systems, and more particularly to power management in a computer system.

Processing circuits in computer systems can have different power requirements at different points in time. For example, idle components can use a lower voltage and less power to retain the state of various values, while active components need a higher voltage and more power. Power requirements can also vary based upon instruction execution, where greater power may be needed due to greater current draw when executing complex floating-point instructions that require a larger number of active circuits as compared to a simple shift or bit-wise logical operation.

A voltage regulator module can be used to regulate and support varying power demands. Voltage regulator modules typically use an operational-amplifier feedback based circuit that can be expensive and consume more space within a system than simpler voltage controls. The impact of voltage control design selection can be more apparent in complex systems that require multiple voltage regulator modules or voltage controls. Voltage controls that operate as simple switches can be effective but may encounter reliability issues due to premature wear out when operating at higher currents over a long period of time.

SUMMARY

According to one embodiment, a system is provided that includes at least one power gated component and two or more power switch transistors configured to provide one or more conductive paths between a common power supply rail, the at least one power gated component, and a ground. The two or more power switch transistors each include a source terminal, a drain terminal, and a gate terminal configured to control current flow between the source and drain terminals. The system also includes a rotating voltage control coupled to the gate terminals of the two or more power switch transistors and configured to apply a sequence of control signals rotating between an on-state and an off-state to each of the gate terminals while the at least one power gated component is turned on. A switch activation ratio level of the rotating voltage control is programmable to set a number of the two or more power switch transistors in the on-state relative to a total number of the two or more power switch transistors.

According to another embodiment, a method is provided for rotating voltage control in a system that includes at least one power gated component and two or more power switch transistors configured to provide one or more conductive paths between a common power supply rail, the at least one power gated component, and a ground. The two or more power switch transistors each include a source terminal, a drain terminal, and a gate terminal configured to control current flow between the source and drain terminals. The method includes establishing a switch activation ratio level to set a number of the two or more power switch transistors in an on-state relative to a total number of the two or more power switch transistors. A sequence of control signals based on the switch activation ratio level is applied to set and rotate the on-state and an off-state to each of the gate terminals of the two or more power switch transistors while the at least one power gated component is turned on.

DETAILED DESCRIPTION

Figure 1:
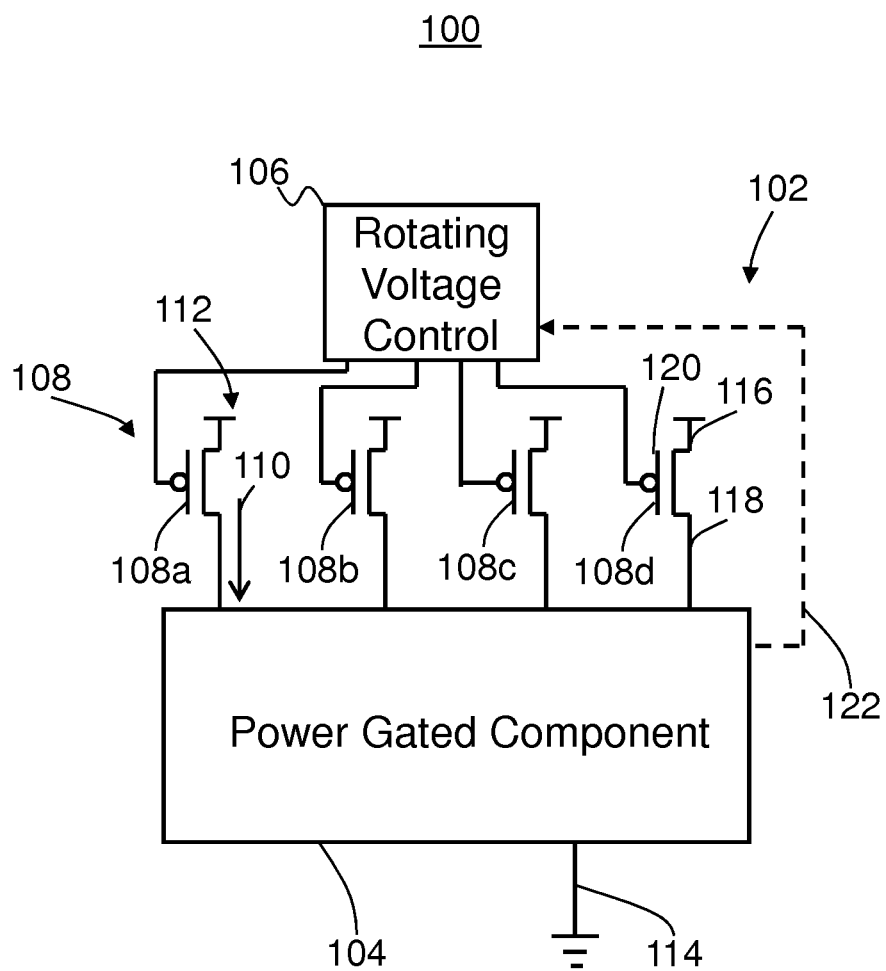
FIG. 1 illustrates a block diagram of a system in accordance with an embodiment.

An embodiment is directed to a system that includes a rotating voltage control. A rotating voltage control system can be implemented as a header or footer device configured to supply power to at least one power gated component. Power gated components can be cores of a multi-core processing chip, or other processing circuits such as a processing element of an active memory device. Power switch transistors, e.g., field effect transistors (FETs), are used to provide one or more conductive paths between a common power supply rail, at least one power gated component, and a ground. A total number of power switch transistors that are in an on-state in parallel can raise or lower voltage to the at least one power gated component. As current flow increases through a reduced number of power switch transistors in the on-state, these power switch transistors can experience a reduced life expectancy due to depletion or wear out.

In exemplary embodiments, a rotating voltage control is provided to apply a sequence of control signals rotating between an on-state and an off-state to each of the power switch transistors while the at least one power gated component is turned on. A switch activation ratio level of the rotating voltage control is programmable to set a number of the power switch transistors in the on-state relative to a total number of the power switch transistors. A rotation controller may be configured to rotate the power switch transistors between the on-state and the off-state according to a programmable rotation interval defining a switch activation duty level as a ratio of time intervals that the on-state and the off-state are alternatively applied to the power switch transistors.

An embodiment is directed to a computer system including a memory device, such as an active memory device. The memory device may be any suitable memory device including one or more memory device (e.g., random access memory "RAM" chips) connected to a hub chip (also referred to as a memory controller chip) configured to control the memory device. In an embodiment, the active memory device includes layers of memory that form a three dimensional ("3D") memory device (also referred to as "memory cube") where individual columns of memory chips form stacks or vaults in communication with the hub chip. In one embodiment, a plurality of memory stacks is located on a memory module, where each stack has an associated hub chip. The hub chips may include a processing element configured to communicate with the memory and other processing elements in other hub chips. In an embodiment, a processing element accesses a selected address in a vault through an interconnect network. In one embodiment, a plurality of memory devices, stacks and processing elements may communicate via the interconnect network, such as a crossbar switch. In embodiments, a memory stack includes multiple dynamic random access memory (DRAM) dies stacked together, where each DRAM die is divided into a number of banks. Further, in the example, a group of banks in each die, vertically aligned, may be referred to as a vault accessed by a vault controller.

Embodiments include a memory stack with a processing element and memory controller in the hub chip, referred to as an active memory device. The active memory device can perform a complex set of operations using multiple locations (e.g., data stored at specific addresses) within the memory device as operands. A process is provided whereby instructions and operations are performed autonomously on these operands within the memory device. Instructions and operations may be stored within the memory device itself and are not dispatched from a main processor, wherein the stored instructions are provided to the processing elements for processing by the processing element in the memory device. In one embodiment, the processing elements are programmable engines, comprising an instruction buffer, an instruction unit, including branching capability and instruction decode, a mixture of vector, scalar, and mask register files, a plurality of load/store units for the movement of data between memory and the register files, and a plurality of execution units for the arithmetic and logical processing of various data types. Also included in the memory device are address translation capabilities for converting or translating virtual addresses to physical addresses, a unified Load/Store Queue to sequence data movement between the memory and the processing elements, and a processor communications unit, for communication with the main processor.

In an embodiment, the active memory device is configured to load configuration information or instructions from a part of the active memory device into a processing element following receiving a command from an external requestor, such as a main processor or another processing element. In addition, the processing element may perform virtual-to-real address translations that it computes while executing the loaded instructions.

In embodiments, it is desirable to have processing capabilities within an active memory device to reduce memory latency and energy consumption that would be experienced when the memory is being accessed by a processor residing in a separate chip. Instead of bringing data from memory to the separate processing chip through lower bandwidth communication paths, performing what are often quite simple calculations on the data, and then transferring the processed data back to memory, the system's main processor configures the processing elements within the active memory device, and then instructs them to carry out the data processing tasks. This may be achieved by sending one or more commands from the main processor to the device. In this scenario, the movement of data between the main processor and memory is greatly reduced, both in the distance it has to travel from the memory chips to the processor chip, and in the number of levels of cache that it has to traverse through the memory hierarchy. Instances of the rotating voltage control system can be applied both within the processor and for the processing elements, as well as other power gated components.

FIG. 1 illustrates a block diagram of a system 100 in accordance with an embodiment. The system 100 includes a rotating voltage control system 102 coupled to at least one power gated component 104. The rotating voltage control system 102 includes a rotating voltage control 106 and a plurality of power switch transistors 108, i.e. two or more power switch transistors 108. The power switch transistors 108 are configured to provide one or more conductive paths 110 between a common power supply rail 112, the at least one power gated component 104, and a ground 114. Although only one ground 114 is depicted in FIG. 1, there can be multiple ground connections for the one or more conductive paths 110. The power switch transistors 108 each include a source terminal 116, a drain terminal 118, and a gate terminal 120 configured to control current flow between the source and drain terminals 116 and 118.

In the example of FIG. 1, there are four power switch transistors 108 including power switch transistor 108a, 108b, 108c, and 108d. The power switch transistors 108 are depicted as P-channel FETs (PFETs) where applying a logical zero or ground to gate terminal 120 allows current (i.e., current level above leakage current) to flow from the common power supply rail 112 through the source terminal 116 and the drain terminal 118 to the at least one power gated component 104. Each of the power switch transistors 108a-d can be independently controlled by applying a high voltage or ground to the gate terminal 120 of each of the power switch transistors 108a-d. While the at least one power gated component 104 is turned on and active, the rotating voltage control 106 may set all of the power switch transistors 108 to the on-state to provide full power and voltage. When the at least one power gated component 104 is turned on but has a low level of activity, the rotating voltage control 106 may set some of the power switch transistors 108 to an off-state to conserve power.

The power conservation is achieved due to the reduction in the voltages at the power supply of the power gated component 104 coupled to the drain terminals 118 of the power switch PFETs 108. Setting of a subset of the power switch transistors 108 to the OFF state increases the resistance between the external power supply 112 and the power rail of the power gated component 104. The increase in the resistance results in an increase in the voltage drop between the source and drain terminals of the power header switch PFETs. If the external power supply voltage is set at 1.2V, the current consumed by the power gated component is 0.5 A, and the power header switch resistance is 1 Ohm, then the voltage drop between the source and drain terminals of the power header switch is 0.5V, and the voltage at the power rail of the power gated component is reduced from 1.2V to 0.7V. The power consumption of the circuits implemented in complementary metal-oxide-semiconductor (CMOS) technology includes two major components: dynamic power alternating current (AC) and static power direct current (DC). The scaling of AC current with the voltage and frequency is modeled using the following equation:

$$AC\_current = frequency * C\_effective * voltage * (voltage/voltage\_base)^{voltage\_exponent},$$

where voltage is the voltage at the power rail of the power gated component, the voltage_base is the voltage at which the current distribution is initially computed, and voltage_exponent is a technology dependent constant. The value of the technology-dependent voltage_exponent can be in the range of between 1 and 1.4. In this example, a value of 1.3 is used.

The static power in processors implemented in CMOS technology is dominated by leakage currents. The scaling of the leakage current with the voltage and temperature is modeled using the following equation:

$$Leakage\_current = IDDQ * temperature\_sensitivity^{(T(t) - T\_IDDQ)/T\_base} * (voltage/V\_IDDQ)^{voltage\_exponent},$$

where temperature_sensitivity, T_base and voltage_exponents are technology-dependent constants. Typical values are temperature_sensitivity=1.2, T_base=10 C and voltage_exponents=3.0.

The power reduction due to reducing the voltage at the power rail of the power gated component 104 from 1.2V to 0.7V in the above example is computed as follows:

AC power reduction factor=$(0.7/1.2)^{1.3}$=0.5

DC power reduction factor=$(0.7/1.2)^{3}$=0.2

If the DC portion of the power is 20% and AC portion is 80%, then the aggregate power reduction factor is 1−(0.8*0.5+ 0.2*0.2)=0.56, which means that a power reduction of 56% is achieved. If the power switch PFET resistance is increased from 1 Ohm to 1.5 Ohm, then the voltage drop between the source and drain terminals of the power switch PFET increases to 0.75V, and 80% of power reduction is achieved.

When the power gated component 104 is idle, a significant amount of power reduction can be achieved by setting it to operation in a retention mode. In the retention mode the frequency is reduced to a very low level (e.g., between 0 KHz and 100 KHz) or the clock is completely stopped. The voltage in the retention mode is reduced to the lowest level required to guarantee all of the memory elements in the power gated component 104 can preserve the state. The memory elements may include the pipeline latches or flip-flops, the state latches of flip-flops, static random access memory (SRAM) memory cells and register file memory cells. The typical value of the retention voltage is in the range of 0.1V to 0.6V. If the retention voltage is set at 0.6V, then the power reduction of $(0.6/1.2)^{3}$=0.125 is achieved, computed using the DC scaling equation.

A power retention gating mode can be used to maintain the state of values in the at least one power gated component 104, for example, by setting power switch transistor 108*a* to the on-state and power switch transistors 108*b-d* to the off-state. If the at least one power gated component 104 remains in the power retention gating mode for an extended period of time, the power switch transistor 108*a* can experience uneven wear and reduction of life relative to power switch transistors 108*b-d*. In exemplary embodiments, the rotating voltage control 106 maintains the number of power switch transistors 108 in the on-state and off-state but rotates which of the power switch transistors 108 are on or off over a period of time. For example, after reaching a rotation time interval, the rotating voltage control 106 sets power switch transistors 108*a*, 108*c*, and 108*d* to the off-state and sets power switch transistor 108*b* to the on-state. This process of rotation can be repeated for multiple time intervals over a larger period of time such that wear based effects are spread across all of the power switch transistors 108.

To further enhance control and wear management, a feedback path 122 may be provided between the at least one power gated component 104 and the rotating voltage control 106. The feedback path 122 can be used to provide any combination of a power proxy, an activity counter, a power measurement, a thermal measurement, or other stress metric to assist the rotating voltage control 106 in determining how many of the power switch transistors 108 should be in the on-state and how frequently rotation should be performed. A power proxy is an estimate of power consumption that can be based on monitoring counters associated with the at least one power gated component 104, such as activity counters and utilization counters, to derive an estimated level of activity over a period of time. Alternatively, counters such as activity counters can be directly provided to the rotating voltage control 106 to assist power/current determination logic. A direct power or current measurement can be provided by one or more sensors (not depicted) via the feedback path 122. Power and/or current measurement can be performed on a component basis for the at least one power gated component 104 or for each of the one or more conductive paths 110 through one or more of the power switch transistors 108 in the on-state. One or more temperature sensors (not depicted) can provide a thermal measurement via the feedback path 122. At higher temperatures leakage current can increase, which can result in a change in the number of power switch transistors 108 in the on-state during the power retention gating mode.

The scaling of the leakage current with the temperature is modeled using the following equation:

Leakage_current=$IDDQ*$ temperature_sensitivity$^{(T(t)-T\_IDDQ)/T\_base}$, where temperature_sensitivity and T_base are technology-dependent constants. Typical values are temperature_sensitivity=1.2, T_base=10 C. In this example the leakage current increases 20% for every 10 C increase in the chip temperature. For example, if the chip temperature increase from 20 C to 40 C, the leakage increase is $1.2^2$=1.44. In order to maintain the voltage at the power rail of the power gated component 104 at the same level, the resistance of the power switch PFET needs to be reduced by factor 1.44. The rotating voltage control 106 accomplishes the required reduction in the header resistance by increasing the number of turned ON power switch PFETs by 50%. In one example, the rotating voltage control 106 increases the number of turned ON power switch PFETs from 2 to 3.

Various inputs provided on the feedback path 122 may be representative of utilization stress that the rotating voltage control 106 can use to change the number of power switch transistors 108 in the on-state and/or the rate of rotation across the power switch transistors 108. For example, rotation can be faster during heavier loads and slower during lighter loads. Time of day, such as day vs. night may also be used as a factor in configuring the power switch transistors 108, where higher activity may be expected during daytime hours. A further alternative is to randomly select on/off patterns for the power switch transistors 108.

While only one power gated component 104 is depicted in FIG. 1, additional instances of the power gated component 104 can be included in the system 100. Each power gated component 104 may be coupled to a separate instance of the rotating voltage control system 102. In an alternate embodiment, multiple power gated components 104 are coupled to one rotating voltage control system 102.

Figure 2:
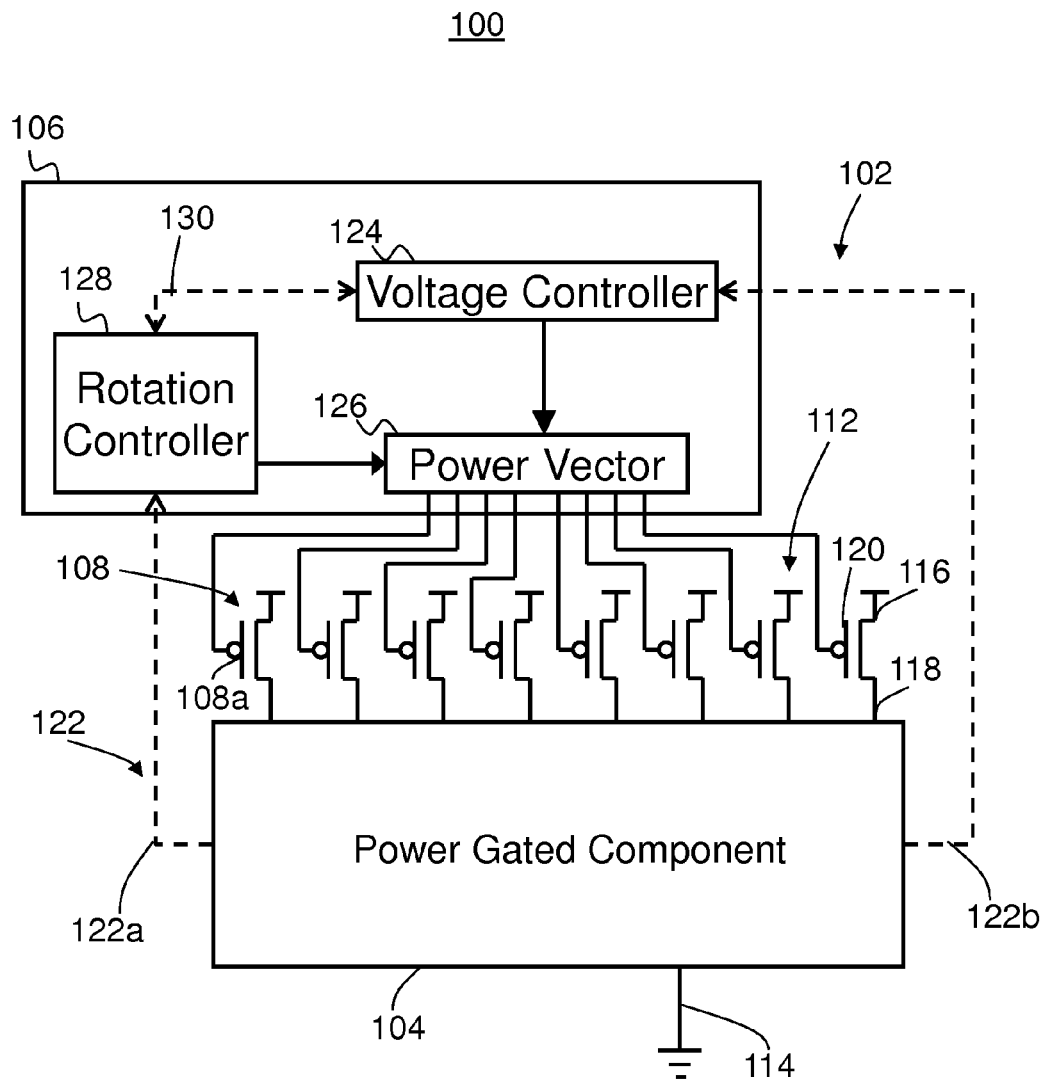
FIG. 2 illustrates a block diagram of the system of FIG. 1 in greater detail in accordance with an embodiment.

FIG. 2 illustrates a block diagram of the system 100 of FIG. 1 in greater detail in accordance with an embodiment. The example of FIG. 2 depicts additional details of the rotating voltage control 106 and additional instances of the power switch transistors 108. A voltage controller 124 of the rotating voltage control 106 can load a power vector 126 with values for each gate terminal 120 of the power switch transistors 108. A rotation controller 128 of the rotating voltage control 106 can rotate values in the power vector 126 to rotate on-state and off-state values of the power switch transistors 108. The feedback path 122 may be subdivided into feedback paths 122*a* and 122*b* such that either or both of the voltage controller 124 and the rotation controller 128 can receive feedback from the at least one power gated component 104. The voltage controller 124 and the rotation controller 128 can operate independently relative to each other or they can exchange information via an optional link 130.

In an embodiment the control algorithms provided by voltage controller 124 are implemented as a controller in hardware. In another embodiment the control algorithms provided by voltage controller 124 are implemented in firmware or software executing on a microcontroller or processor. In an embodiment the control algorithms provided by rotation controller 128 are implemented as a controller in hardware. In another embodiment the control algorithms provided by rotation controller 128 are implemented in firmware or software executing on a microcontroller or processor. In an embodiment the voltage controller 124 is physically located on the same chip as the power gated component 104. In another embodiment the voltage controller 124 is physically located on another chip than the power gated component 104 and communicates values to power vector 126 through inter-chip communication channels. In an embodiment the rotation controller 128 is physically located on the same chip as the power gated component 104. In another embodiment the rotation controller 128 is physically located on another chip than the power gated component 104 and communicates commands to rotate the power vector 126 through inter-chip communication channels.

A switch activation ratio level is established in the voltage controller 124 to set a number of the power switch transistors 108 in the on-state relative to a total number of the power switch transistors 108. The switch activation ratio level can be set as a sequence of logical ones and zeros in the power vector 126. For example a switch activation ratio level of 3:8 can indicate that three of the eight power switch transistors 108 of FIG. 2 should be set to the on-state and five of the eight power switch transistors 108 of FIG. 2 should be set to the off-state. A switch activation ratio level of 3:8 can be stored in the power vector 126 as "11100011", for example, where the power switch transistors 108 of FIG. 2 are low asserting PFETs. Other combinations of 0/1 sequences are also possible in this example, e.g., "10101011", "00011111", etc. The power vector 126 can set the on-state and off-state to each of the gate terminals 120 of the power switch transistors 108 while the at least one power gated component 104 is turned on. Setting all of the gate terminals 120 to the off-state turns the at least one power gated component 104 off after any current from internal capacitance dissipates.

The rotation controller 128 controls rotation of values in the power vector 126. The rotation controller 128 is configured to rotate the power switch transistors 108 between the on-state and the off-state via the power vector 126 according to a programmable rotation interval. The programmable rotation interval defines a switch activation duty level as a ratio of time intervals that the on-state and the off-state are alternatively applied to the gate terminal 120 of one of the power switch transistors 108. The switch activation duty level can indicate how quickly the power switch transistor 108a will alternate states between the on and off-states. For example, with respect to power switch transistor 108a, the programmable rotation interval can be programmed as a period of time such as rotation every 10 milliseconds, 1 second, 10 seconds, 100 seconds, once a day, once a week, etc. to enable any interval supported by the system 100. The programmable rotation interval can be implemented using a simple counter, where each time that the counter counts to a predetermined value or wraps around, rotation of the power vector 126 is performed.

The voltage controller 124 and the rotation controller 128 both can change values in the power vector 126, where values are loaded by the voltage controller 124 and rotated by the rotation controller 128. A sequence of control signals applied to the gate terminals 120 is held in the power vector 126 as logical zeros and ones that correspond to the on-state and the off-state, and rotates over a period of time such that each of the power switch transistors 108 alternates between the on-state and the off-state over the period of time. The number of the logical zeros and ones in the power vector 126 can remain fixed while the power vector 126 rotates over the period of time. For example, if the voltage controller 124 loads the power vector 126 with a value of "01111111", the rotation controller 128 does not change the number of ones and zeros in the power vector 126 but could rotate the power vector 126 through the following sequence: "01111111", "10111111", "11011111", "11101111", "11110111", "11111011", "11111101", and "11111110", with the sequence repeating.

The switch activation ratio level may be set by the voltage controller 124 based on one or more of: a power proxy, an activity counter, a current measurement, a power measurement, or a thermal measurement received on feedback path 122b. The feedback path 122b can also provide an indication to the voltage controller 124 of the amount of current drawn by the at least one power gated component 104. The switch activation ratio level can be controllably set individually for the at least one power gated component 104 based on an amount of current drawn such that during time intervals with higher current draw the switch activation ratio level is increased, and during time intervals with lower current draw the switch activation ratio level is decreased.

The programmable rotation interval may be set by the rotation controller 128 based on one or more of: a power proxy, an activity counter, a current measurement, a power measurement, or a thermal measurement received on feedback path 122a. The feedback path 122a can also provide an indication to the rotation controller 128 of the amount of current passing through one or more of the power switch transistors 108. The programmable rotation interval can be controllably set individually for the at least one power gated component 104 depending on an amount of current passing through one or more of the power switch transistors 108 in the on-state such that during time intervals with higher current the programmable rotation interval is decreased, and during time intervals with lower current the programmable rotation interval is increased.

Figure 3:
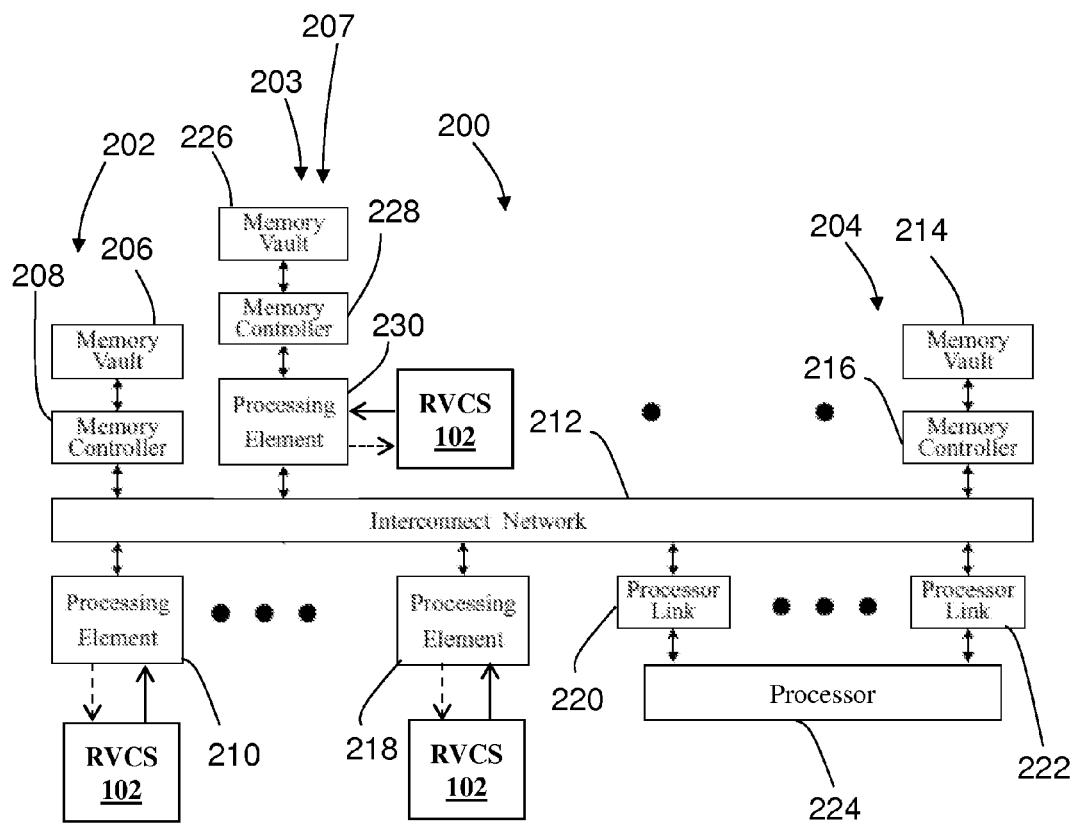
FIG. 3 is a block diagram of a computer system including rotating voltage control systems in accordance with an embodiment.

FIG. 3 is a schematic diagram of an embodiment of a computer system 200 with rotating voltage control as an example of an in-memory computer system. In one embodiment, the computer system 200 includes an active memory device 202, an active memory device 203 and an active memory device 204. The active memory device 202 includes a memory vault 206, a memory controller 208 and a processing element 210. In an embodiment, the processing element 210, memory vault 206 and memory controller 208 are coupled and communicate via an interconnect network 212. Specifically, the processing element 210 communicates to the memory vault 206, memory controller 208 and other memory devices, such as active memory devices 203 and 204, via the interconnect network 212. The interconnect network 212 is also coupled to a main processor 224 by processor links 220-222. The interconnect network 212 provides a fast and high bandwidth path for communication between portions of the computer system 200, such as processing elements, memory controllers and memory, to provide improved performance and reduced latency for the active memory.

The active memory device 203 includes a memory vault 226, a memory controller 228 and a processing element 230. In an embodiment, the processing element 230, memory vault 226 and memory controller 228 are all located on the same side of the interconnect network 212, such as within a single stack. By positioning the processing element 230 in the same stack as memory vault 226, the latency is reduced when accessing locations in the memory vault 226, thus further improving performance. In one embodiment, the active memory device 204 includes a memory vault 214 and memory controller 216 coupled to processing elements 210 and processing element 218 via the interconnect network 212. As depicted, the processing element 218 is located on the other side of the interconnect network 212 from the memory controller 216 and memory vault 214. In embodiments, the active memory devices 202, 203 and 204 include multiple layers of stacked addressable memory elements. Further, the stack's memory may be divided into memory vaults 206, 226 and 214, or three-dimensional blocked regions of the memory device which share a common memory controller and/or memory element, and are capable of servicing memory access requests to their domain of memory independently of one another.

To control voltage and power in the processing elements 210, 218, and 230, one or more instances of the rotating voltage control system 102 can be coupled to the processing elements 210, 218, and 230, where the processing elements 210, 218, and 230 are examples of the at least one power gated component 104 of FIG. 1. Each of the processing elements 210, 218, and 230 can have an independent instance of the rotating voltage control system 102. Alternatively, a single instance of the rotating voltage control system 102 can be coupled to two or all of the processing elements 210, 218, and 230.

A combination of a memory stack, such as memory vault 226, and a hub chip that includes memory controller 228 and processing element 230 forms a lane 207. The computer system 200 can include multiple lanes 207 which may be independently turned on and off as well. A higher-level system can include multiple instances of the computer system 200 and each computer system 200 can include multiple lanes 207. Additionally, an active memory device can include multiple lanes 207, which may be arranged to form an active memory cube.

In embodiments, the processing elements, memory vaults and memory controllers may be arranged in a suitable manner depending on the application. For example, one or more processing elements, such as processing element 218, may be positioned on one side of the interconnect network 212 and may operate as a pool of processing elements that are available for accessing any memory in the memory system coupled to the interconnect network 212. The pooled processing elements are not limited to accessing a particular memory vault and, thus, one or more elements may be utilized upon receiving a command from the main processor 224. Accordingly, processing element 218 may be configured to access each memory vault 206, 226 and 214. In another embodiment, one or more processing elements, such as processing element 230, is located as part of a stack including a memory vault 226 and memory controller 228. In such a configuration, the processing element 230 is configured to access memory vault 226 coupled to the interconnect network 212, including memory vaults 206 and 214. In one embodiment, one or more processing element, such as processing element 210, is positioned on an opposite side of the interconnect network 212 from the memory vault 206 and memory controller 208. In the configuration, the processing element 210 is configured to access any memory coupled to the interconnect network 212, including memory vaults 226 and 214.

Figure 4:
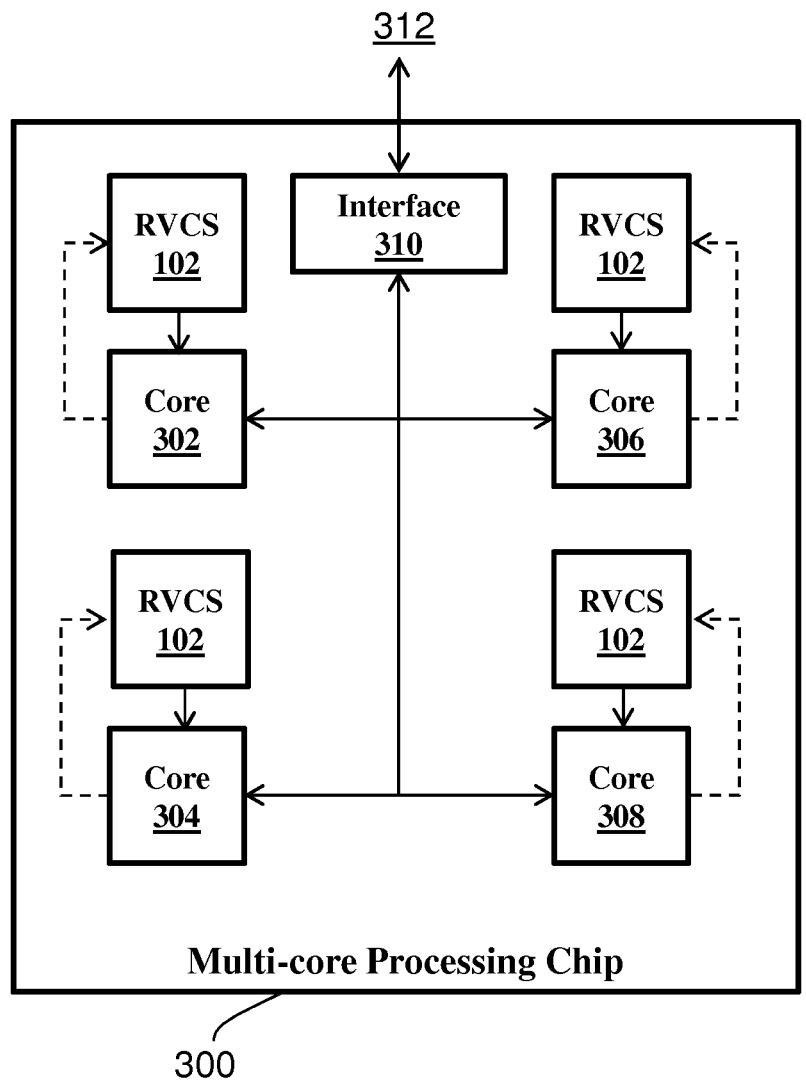
FIG. 4 is a block diagram of a multi-core processing chip including rotating voltage control systems in accordance with another embodiment.

FIG. 4 is a block diagram of a multi-core processing chip 300 including rotating voltage control systems 102 of FIG. 1 in accordance with another embodiment. The multi-core processing chip 300 can be an embodiment of the main processor 224 of FIG. 3 or a processor for use in various other computer system configurations. In the example of FIG. 4, the multi-core processing chip 300 includes four cores, core 302, 304, 306, and 308. The cores 302-308 may be coupled to each other and to an interface 310 to access external resources 312 such as a memory system, inputs/outputs, a network connection, and the like. To control voltage and power in each of the cores 302-308, one or more instances of the rotating voltage control system 102 can be coupled to the cores 302-308, where the cores 302-308 are examples of the at least one power gated component 104 of FIG. 1. Each of the cores 302-308 can have an independent instance of the rotating voltage control system 102. Alternatively, a single instance of the rotating voltage control system 102 can be coupled to two or more of the cores 302-308. While the example of FIG. 4 includes four cores 302-308, any number of cores can be supported in embodiments.

Figure 5:
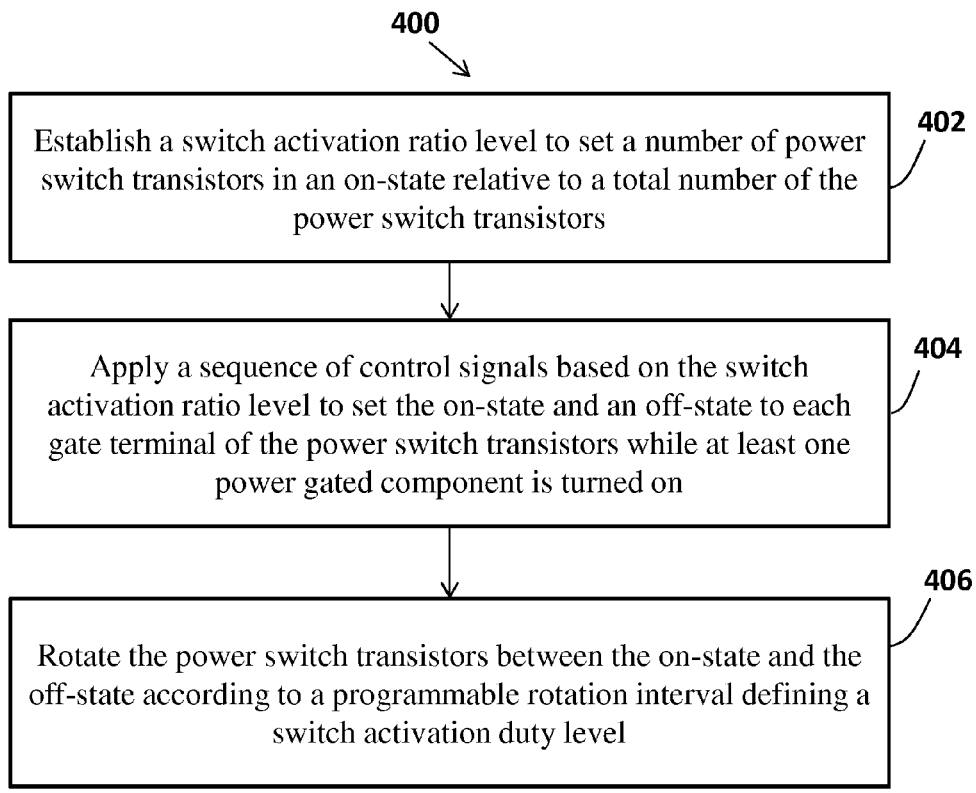
FIG. 5 is a process flow diagram for rotating voltage control in a system in accordance with an embodiment.

FIG. 5 is a process flow diagram for rotating voltage control in a system in accordance with an embodiment. A process 400 of FIG. 5 can be performed by the rotating voltage control system 102 of FIG. 1. As previously described with respect to FIG. 1, at least one power gated component 104 and two or more power switch transistors 108 can be configured to provide one or more conductive paths 110 between a common power supply rail 112, the at least one power gated component 104, and a ground 114. The two or more power switch transistors 108 each include a source terminal 116, a drain terminal 118, and a gate terminal 120 configured to control current flow between the source and drain terminals 116 and 118. The at least one power gated component 104 can be at least one core of a multi-core processing chip, such as cores 302-308 of the multi-core processing chip 300 of FIG. 3. In another embodiment, the at least one power gated component 104 is at least one processing element of an active memory device, where the active memory device includes a plurality of memory stacks associated with the at least one processing element, such as the active memory device 202, 203, and/or 204 of FIG. 3 including processing elements 210, 218, and 230.

At block 402, a switch activation ratio level is established to set a number of the two or more power switch transistors 108 in an on-state relative to a total number of the two or more power switch transistors 108.

At block 404, a sequence of control signals is applied based on the switch activation ratio level to set the on-state and an off-state to each of the gate terminals 120 of the two or more power switch transistors 108 while the at least one power gated component 104 is turned on. The switch activation ratio level can be controllably set individually for the at least one power gated component 104 based on an amount of current drawn such that during time intervals with higher current draw the switch activation ratio level is increased, and during time intervals with lower current draw the switch activation ratio level is decreased. The switch activation ratio level can be set based on one or more of: a power proxy, an activity counter, a current measurement, a power measurement, and a thermal measurement.

At block 406, the two or more power switch transistors 108 are rotated between the on-state and the off-state according to a programmable rotation interval defining a switch activation duty level as a ratio of time intervals that the on-state and the off-state are alternatively applied to the gate terminal 120 of one of the two or more power switch transistors 108, such as to power switch transistor 108a of FIG. 1. The programmable rotation interval can be controllably set individually for the at least one power gated component 104 depending on an amount of current passing through one or more of the power switch transistors 108 in the on-state such that during time intervals with higher current the programmable rotation interval is decreased, and during time intervals with lower current the programmable rotation interval is increased. The programmable rotation interval can be set based on one or more of: a power proxy, an activity counter, a current measurement, a power measurement, and a thermal measurement.

The sequence of control signals applied to the gate terminals 120 is held in a power vector 126 of logical zeros and ones that correspond to the on-state and the off-state, and rotates over a period of time such that each of the two or more power switch transistors 108 alternates between the on-state and the off-state over the period of time. A number of the logical zeros and ones in the power vector 126 can remain fixed while the power vector 126 rotates over the period of time.

Figure 6:
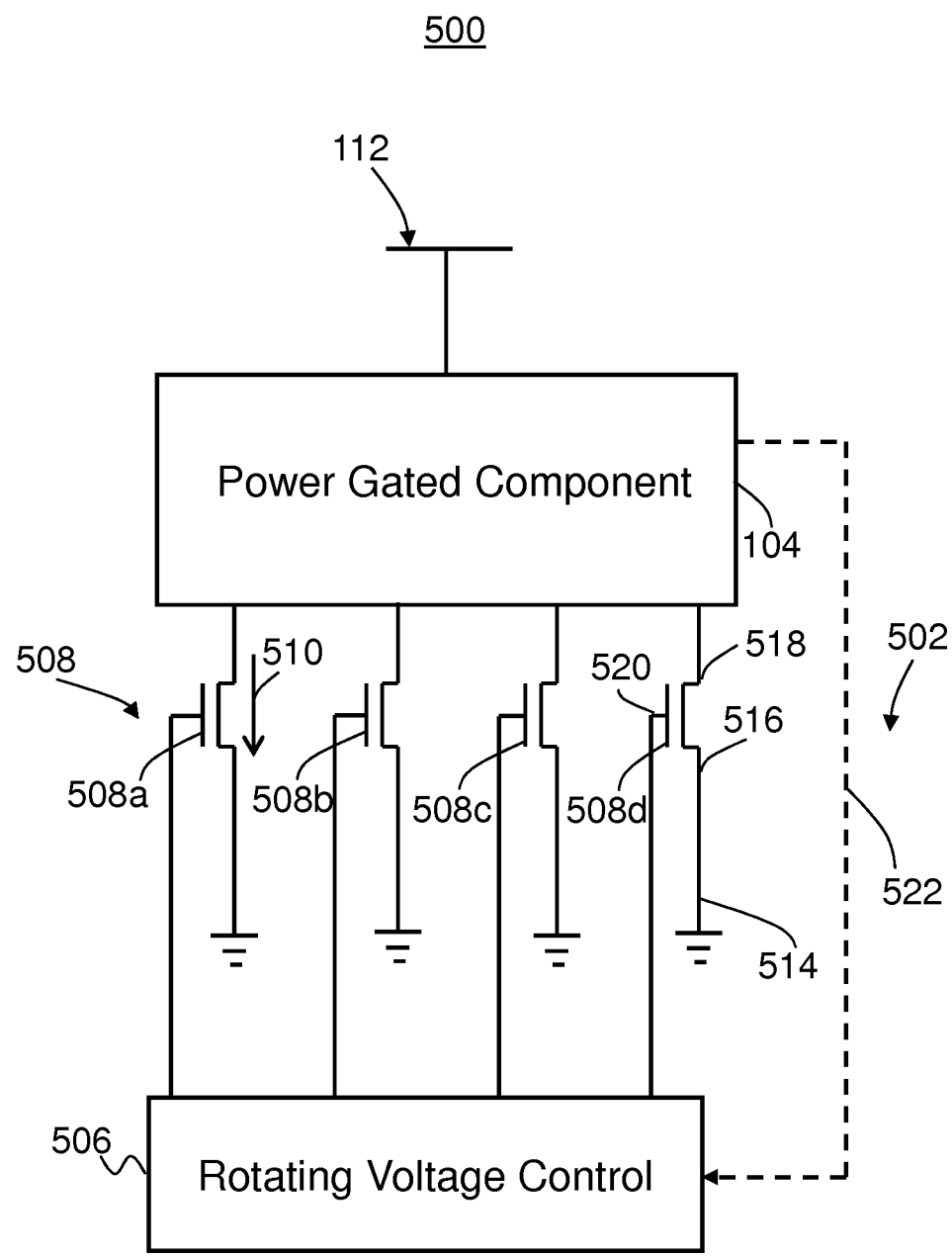
FIG. 6 is an alternate embodiment of the system of FIG. 1.

FIG. 6 is an alternate embodiment of the system 100 of FIG. 1. A system 500 of FIG. 6 includes a rotating voltage control system 502 coupled to at least one power gated component 104. The rotating voltage control system 502 is similar to the rotating voltage control system 102 of FIG. 1 and includes a rotating voltage control 506 and a plurality of power switch transistors 508, i.e. two or more power switch transistors 508. The power switch transistors 508 are configured to provide one or more conductive paths 510 between the common power supply rail 112, the at least one power gated component 104, and one or more ground 514. The power switch transistors 508 each include a source terminal 516, a drain terminal 518, and a gate terminal 520 configured to control current flow between the source and drain terminals 516 and 518.

In the example of FIG. 6, there are four power switch transistors 508 including power switch transistor 508*a*, 508*b*, 508*c*, and 508*d*. The power switch transistors 508 are depicted as N-channel FETs (NFETs) where applying a logical one or high voltage to gate terminal 520 allows current (i.e., current level above leakage current) to flow from the common power supply rail 112 through the at least one power gated component 104, and from the drain terminal 518 through the source terminal 516 to ground 514. Each of the power switch transistors 508*a-d* can be independently controlled by applying a high voltage or ground to the gate terminal 520 of each of the power switch transistors 508*a-d*. While the at least one power gated component 104 is turned on and active, the rotating voltage control 506 may set all of the power switch transistors 508 to the on-state to provide full power and voltage. When the at least one power gated component 104 is turned on but has a low level of activity, the rotating voltage control 506 may set some of the power switch transistors 508 to an off-state to conserve power.

Similar to the system 100 FIG. 1, a feedback path 522 may be provided between the at least one power gated component 104 and the rotating voltage control 506. The feedback path 522 can be used to provide any combination of a power proxy, an activity counter, a current measurement, a power measurement, a thermal measurement, or other stress metric to assist the rotating voltage control 506 in determining how many of the power switch transistors 508 should be in the on-state and how frequently rotation should be performed.

The configuration of FIG. 1 is referred to as a header configuration, where switching is performed between the common power supply rail 112 and the at least one power gated component 104. The configuration of FIG. 6 is referred to as a footer configuration, where switching is performed between the at least one power gated component 104 and one or more ground 514. In an alternate embodiment, both header and footer configurations are included in the same system.

Technical effects and benefits include systems and methods that provide rotating voltage control for at least one power gated component. Using a header and/or footer configuration, a rotating voltage control applies a sequence of control signals rotating between an on-state and an off-state to two or more power switch transistors while the at least one power gated component is turned on. The two or more power switch transistors are configured to provide one or more conductive paths between a common power supply rail, the at least one power gated component, and a ground. The number of power switch transistors in the on-state and rate of rotation can vary according to system configuration, utilization, and other factors. Accordingly, wear across the two or more power switch transistors occurs more evenly while at least one power switch transistor is on and at least one power switch transistor is off.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system, comprising:
   at least one power gated component;
   two or more power switch transistors configured to provide one or more conductive paths between a common power supply rail, the at least one power gated component, and a ground, the two or more power switch transistors each comprising a source terminal, a drain terminal, and a gate terminal configured to control current flow between the source and drain terminals; and
   a rotating voltage control coupled to the gate terminals of the two or more power switch transistors and configured to apply a sequence of control signals rotating between an on-state and an off-state to each of the gate terminals while the at least one power gated component is turned on, and a switch activation ratio level of the rotating voltage control is programmable to set a number of the two or more power switch transistors in the on-state relative to a total number of the two or more power switch transistors, wherein the sequence of control signals applied to the gate terminals is held in a power vector as logical zeros and ones that correspond to the on-state and the off-state, and rotates over a period of time such that each of the two or more power switch transistors alternates between the on-state and the off-state over the period of time, and further wherein a number of the logical zeros and ones in the power vector remains fixed while the power vector rotates over the period of time.

2. The system of claim 1, wherein the rotating voltage control further comprises a rotation controller configured to rotate the two or more power switch transistors between the on-state and the off-state according to a programmable rotation interval defining a switch activation duty level as a ratio of time intervals that the on-state and the off-state are alternatively applied to the gate terminal of one of the two or more power switch transistors.

3. The system of claim 2, wherein the programmable rotation interval is controllably set individually for the at least one power gated component depending on an amount of current passing through one or more of the power switch transistors in the on-state such that during time intervals with higher current the programmable rotation interval is decreased, and during time intervals with lower current the programmable rotation interval is increased.

4. The system of claim 2, wherein the programmable rotation interval is set based on one or more of: a power proxy, an activity counter, a current measurement, a power measurement, and a thermal measurement.

5. The system of claim 1, wherein the switch activation ratio level is controllably set individually for the at least one power gated component based on an amount of current drawn such that during time intervals with higher current draw the switch activation ratio level is increased, and during time intervals with lower current draw the switch activation ratio level is decreased.

6. The system of claim 1, wherein the switch activation ratio level is set based on one or more of: a power proxy, an activity counter, a current measurement, a power measurement, and a thermal measurement.

7. The system of claim 1, wherein the at least one power gated component is at least one core of a multi-core processing chip.

8. The system of claim 1, wherein the at least one power gated component is at least one processing element of an active memory device, the active memory device comprising a plurality of memory stacks associated with the at least one processing element.

9. A method for rotating voltage control in a system comprising at least one power gated component and two or more power switch transistors configured to provide one or more conductive paths between a common power supply rail, the at least one power gated component, and a ground, the two or more power switch transistors each comprising a source terminal, a drain terminal, and a gate terminal configured to control current flow between the source and drain terminals, the method comprising:
  establishing a switch activation ratio level to set a number of the two or more power switch transistors in an on-state relative to a total number of the two or more power switch transistors; and
  applying a sequence of control signals based on the switch activation ratio level to set and rotate the on-state and an off-state to each of the gate terminals of the two or more power switch transistors while the at least one power gated component is turned on, wherein the sequence of control signals applied to the gate terminals is held in a power vector of logical zeros and ones that correspond to the on-state and the off-state, and rotates over a period of time such that each of the two or more power switch transistors alternates between the on-state and the off-state over the period of time, and further wherein a number of the logical zeros and ones in the power vector remains fixed while the power vector rotates over the period of time.

10. The method of claim 9, further comprising:
  rotating the two or more power switch transistors between the on-state and the off-state according to a programmable rotation interval defining a switch activation duty level as a ratio of time intervals that the on-state and the off-state are alternatively applied to the gate terminal of one of the two or more power switch transistors.

11. The method of claim 10, wherein the programmable rotation interval is controllably set individually for the at least one power gated component depending on an amount of current passing through one or more of the power switch transistors in the on-state such that during time intervals with higher current the programmable rotation interval is decreased, and during time intervals with lower current the programmable rotation interval is increased.

12. The method of claim 10, wherein the programmable rotation interval is set based on one or more of: a power proxy, an activity counter, a current measurement, a power measurement, and a thermal measurement.

13. The method of claim 9, wherein the switch activation ratio level is controllably set individually for the at least one power gated component based on an amount of current drawn such that during time intervals with higher current draw the switch activation ratio level is increased, and during time intervals with lower current draw the switch activation ratio level is decreased.

14. The method of claim 9, wherein the switch activation ratio level is set based on one or more of: a power proxy, an activity counter, a current measurement, a power measurement, and a thermal measurement.

15. The method of claim 9, wherein the at least one power gated component is at least one core of a multi-core processing chip.

16. The method of claim 9, wherein the at least one power gated component is at least one processing element of an active memory device, the active memory device comprising a plurality of memory stacks associated with the at least one processing element.

* * * * *